(12) United States Patent
Roberts et al.

(10) Patent No.: US 12,491,454 B2
(45) Date of Patent: Dec. 9, 2025

(54) DEVICES AND METHODS FOR MOVING, REMOVING AND/OR INSTALLING ONE OR MORE COMPONENTS OF A TREATMENT UNIT

(71) Applicant: ROBERTS MARKETING DE, INC., Wilmington, DE (US)

(72) Inventors: R. Lee Roberts, Rose Valley, PA (US); Matthew Roberts, Downingtown, PA (US)

(73) Assignee: Roberts Marketing DE, Inc., Wilimington, DE (US)

( * ) Notice: Subject to any disclaimer, the term of this patent is extended or adjusted under 35 U.S.C. 154(b) by 0 days.

(21) Appl. No.: 18/795,502

(22) Filed: Aug. 6, 2024

(65) Prior Publication Data
US 2024/0390822 A1    Nov. 28, 2024

Related U.S. Application Data

(60) Continuation of application No. 17/373,971, filed on Jul. 13, 2021, now Pat. No. 12,083,451, which is a
(Continued)

(51) Int. Cl.
*B01D 24/46* (2006.01)
*B01D 24/20* (2006.01)

(52) U.S. Cl.
CPC ......... *B01D 24/4631* (2013.01); *B01D 24/20* (2013.01); *B01D 2101/02* (2013.01); *B01D 2101/04* (2013.01); *B01D 2201/64* (2013.01)

(58) Field of Classification Search
CPC ....... B01F 3/04241; C02F 3/20; F16L 3/1218; F16L 3/223; Y02W 10/10
See application file for complete search history.

(56) References Cited

U.S. PATENT DOCUMENTS 5,089,179 A   2/1992   von Nordenskjold
5,673,481 A   10/1997  Roberts et al.
(Continued)

FOREIGN PATENT DOCUMENTS

CN    107213678 A  *  9/2017  ......... B01D 24/4636

OTHER PUBLICATIONS

Official Action dated Nov. 21, 2019 issued in corresponding Canadian Patent Application No. 3,020,750, four pages (NPL1).
(Continued)

*Primary Examiner* — Dirk R Bass
(74) *Attorney, Agent, or Firm* — Merek, Blackmon & Voorhees, LLC

(57) ABSTRACT

Devices and methods associated therewith for facilitating movement, removal and/or installation of components from treatment units (e.g., water treatment units and wastewater treatment units). The treatment unit can take the form of a granular media filter (e.g., upflow filter, downflow filter or bi-flow filter) or a sludge collection basin. One preferred device is one or more floats facilitating safe removal of components of a treatment unit. The float(s) can be operably associated with an air scour system of a water filter to remove the air scour system from a granular media filter bed. The float(s) can be operably associated with a collection grid of a sludge collection container facilitating safe removal of the collection grid from the sludge collection container. Another preferred device is a flexible piping/conduit operably connected to a pressurized air source and an air scour system to assist in removal/installation of the air scour system.

20 Claims, 13 Drawing Sheets

Related U.S. Application Data division of application No. 16/156,415, filed on Oct. 10, 2018, now Pat. No. 11,090,586.

(56) References Cited

U.S. PATENT DOCUMENTS

| | | | |
|---|---|---|---|
| 5,906,774 | A | 5/1999 | Loy |
| 6,478,964 | B1 | 11/2002 | Redmon |
| 8,016,272 | B2 | 9/2011 | Tharp |
| 8,740,194 | B1 | 6/2014 | Alenzi |
| 8,889,015 | B2 | 11/2014 | Roberts et al. |
| 11,090,586 | B2 | 8/2021 | Roberts et al. |
| 2012/0111777 | A1* | 5/2012 | Roberts .............. B01D 24/4626 210/232 |

OTHER PUBLICATIONS

Official Action dated Nov. 21, 2019 issued in corresponding Canadian Patent Application No. 3,020,750, four pages (NPL2).

* cited by examiner

DEVICES AND METHODS FOR MOVING, REMOVING AND/OR INSTALLING ONE OR MORE COMPONENTS OF A TREATMENT UNIT

RELATED APPLICATIONS

The subject patent application is a continuation of U.S. patent application Ser. No. 17/373,971 filed on Jul. 13, 2021, which is a divisional of U.S. patent application Ser. No. 16/156,415 filed on Oct. 10, 2018. The entire contents of each of U.S. patent application Ser. Nos. 17/373,971 and 16/156,415 are incorporated herein by reference.

FIELD OF THE INVENTION

Preferred forms of the present invention are directed to devices and methods associated with these devices for facilitating movement, removal and/or installation one or more components of a treatment unit. The treatment unit can take the form of a water treatment unit or a wastewater treatment unit. For example, the treatment unit could take the form of a granular media filter (e.g., upflow filter, downflow filter or bi-flow filter) or a sludge collection basin. One preferred device includes at least one float which facilitates movement, removal and/or installation of one or more components of a treatment unit. The at least one float can be connected to or otherwise operably associated with an air scour system of a water filter to facilitate movement and/or removal of the air scour system. For example, the float can raise an air distribution header, one or more laterals and one or more sub-laterals a predetermined distance from an operating position in a water filter wherein the air distribution header, the one or more laterals and the one or more sub-laterals are embedded in a filter bed when in the operating position. The predetermined distance may be a distance where the air distribution header, the one or more laterals and the one or more sub-laterals are raised above and/or rest on an upper portion of the filter bed so that one or more individuals can readily and safely access the air distribution header, the one or more laterals and the one or more sub-laterals.

The at least one float can be connected to or otherwise operably associated with a sludge collection grid of a sludge collection basin or container to facilitate movement and/or removal of the sludge collection grid of the sludge collection basin or container.

Another preferred device is a flexible piping/conduit operably connected to a pressurized air source and an air scour system to assist in raising, removing, lowering and/or installing the air scour system of a water filter.

A further preferred device is a flexible piping/conduit operably connected to a pressurized air source and an air scour system which allows for removal and replacement of a filter bed of a water filter with minimal dismantling/disassembly of the air scour system.

A preferred method associated with the at least one float ensures that no individual is exposed to a hazardous environment when one or more components are raised in, lowered in or removed from the treatment unit.

A preferred method associated with the flexible piping/conduit allows for the installation of an air scour system at a precise point/area in a filter bed of a water filter and/or removal of the air scour system from a medium without disconnecting the air scour system from a source of pressurized air.

BACKGROUND OF THE INVENTION

In numerous applications, an air scour system is considered a vital/important feature of a water filter to provide an air scouring step during washing of a granular media filter (e.g., an up-flow filter, downflow filter and/or a bi-flow filter) to remove impurities trapped in the filter bed during a filtration cycle. The air scour can be performed with or without a liquid backwash. Over time, the air scour system must be removed for maintenance or complete replacement. Also, from time to time the filter bed must be removed and replaced. When the filer bed is replaced the air scour system may need to be removed from the existing filter bed. One extremely popular method of removing the air scour system from the filter bed and/or the water treatment unit is to fluidize the filter bed while an individual is standing on one or more planks placed across the top of the filter compartment/housing so that the individual can raise upwardly the air scour system while the filter bed is fluidized. Elaborate and time-consuming steps must be taken to ensure that the individual does not fall into the fluidized bed during the removal process (e.g., a harness must be placed on the individual). Accordingly, there is a real and significant need for a device and/or process that removes an air scour system from a granular media filter bed that does not subject any individual to harm during the removal process whether the removal process merely removes the air scour system from the filter bed or the process removes the air scour system from the housing of the water treatment unit. Similar hazards may exist with removal of sludge collection components from a sludge collection basin/container.

Further, during lowering, installation, raising and/or removal of an air scour system, the air scour system typically must be disconnected from piping supplying pressurized air to the air scour system so that the air scour system can be lowered, installed, raised and/or removed from the filter bed and/or the compartment/housing of a water filter. Dismantling/disassembling portions of the air scour system is time consuming. Accordingly, there is a real and significant need for a device that allows for raising, removal, lowering and/or installation of an air scour system in a filter bed/filter compartment without disconnecting the air scour system and the pressurized air source. There is also a real and significant need for an air scour system that allows for precise placement of an air scour system in a filter bed.

OBJECTS AND SUMMARY OF THE INVENTION

An object of a preferred form of the present invention is to provide a novel and unobvious device and/or process for facilitating raising, removing, lowering and/or installing of one or more components of a treatment unit (e.g., water treatment unit and a wastewater treatment unit).

Another object of a preferred form of the present invention is to provide a novel and unobvious device and/or method for facilitating raising, removing, lowering and/or installing an air scour system without disconnecting the air scour system from a pressurized source of air.

A further object of a preferred form of the present invention is to provide a novel and unobvious device and method for installing an air scour system in a particular and predetermined portion of a granular media filter bed without disconnecting the air scour system from a pressurized source of air.

Still another object of a preferred form of the present invention is to provide one or more floats for raising, removing, lowering and/or installing one or more components of a water treatment unit or a wastewater treatment unit where no individual could fall into a hazardous environment (e.g., a fluidized bed of a water filter).

Yet another object of a preferred form of the present invention is to provide one or more floats that automatically raise (i.e., without assistance of an individual) one or more components of a water or wastewater treatment unit embedded in a material/substance housed by the water or wastewater treatment unit out of the material/substance when a liquid is directed into the water or wastewater treatment unit.

Yet a further object of a preferred form of the present invention is to provide one or more floats that automatically lower (i.e., without assistance of an individual) one or more components of a water or wastewater treatment unit when a liquid is drained from the water or wastewater treatment unit.

Still a further object of a preferred form of the present invention is to provide one or more floats that automatically raise one or more components of a water or wastewater treatment unit embedded in a material/substance housed in the water or wastewater treatment unit out of the material/substance when the water is directed into the water or wastewater treatment unit and when water in the water or wastewater treatment unit is drained the one or more floats automatically lower the one or more components to a position wherein the one or more components rest on or are disposed above an uppermost portion of the material/substance so that an individual can readily access the one or more components for maintenance, dismantling or removal from the water or wastewater treatment unit.

Yet another object of a preferred embodiment of the present invention is to provide one or more float assemblies configured to allow for movement of one or more components in a treatment unit even where existing support structures in the treatment unit could obstruct movement of the one or more components.

Yet still a further object of the present invention is to provide a device and/or method for facilitating removal and replacement of a filter bed of a water treatment unit without disconnecting a header and a drop pipe of an existing air scour system from a pressurized air source during removal and replacement of the filter bed.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention. Further, the above is not an exhaustive list of the advantages and objects of the preferred forms of the present invention. Other advantages and objects of preferred forms of the present invention will be readily appreciated from the description of the preferred forms of the present invention.

In summary, one preferred embodiment of the present invention is directed an apparatus for facilitating movement of one or more components in a treatment unit. The apparatus includes a component movement assist float configured to be operably connected to one or more components of a treatment unit such that when sufficient liquid is present in the treatment unit, the component movement assist float causes the one or more components to move with the component movement assist float in the treatment unit to facilitate removal of the one or more components from one of the treatment unit and a material housed in the treatment unit. The treatment unit is one of a water treatment unit and a wastewater treatment unit.

Another preferred embodiment of the present invention is directed to apparatus for removing impurities from water. The apparatus includes a water filter having a granular media filter bed and an air scour unit disposed in the granular media filter bed. A float is operably connected to the air scour unit. The float is configured such that when the granular media filter bed is sufficiently expanded by a liquid passing through the granular media filter bed and a water level in the water filter rises, the float causes the air scour unit to move upwardly to a position where when the filter bed resumes a filtering state the air scour unit is disposed above the filter bed.

A further embodiment of the present invention is directed to an air scour system for a water treatment unit. The air scour system includes a drop pipe, a header and at least one lateral to direct air through a filter bed of a water treatment unit during a cycle of the water treatment unit. A flexible conduit is provided having a first end and a second end. The first end of the flexible conduit is connected to the drop pipe. The flexible conduit is configured to allow an operating position of the air scour system in the filter bed to be varied during installation of the air scour system.

Still a further embodiment of the present invention includes an apparatus for removing one of an air scour grid from a filter bed of a water filter and a sludge collection member from sludge of a wastewater treatment unit. The apparatus includes a float operably connected to a treatment component. The treatment component is one of an air scour grid embedded in a filter bed of a water filter for air scouring the filter bed of the water filter and a sludge collection member embedded in sludge of a wastewater treatment unit. The float is configured such that when a liquid is directed through one of the water filter and the sludge collection member, the float causes the treatment component to move vertically upward to a position where if the treatment component is an air scour grid the treatment component is raised out of the filter bed and if the treatment component is a sludge collection member the treatment component is raised out of the sludge.

Still another embodiment of the present invention is directed to a method for moving a component in a treatment unit. The method includes providing a treatment unit for treating one of sludge and water and operably attaching a float to a component disposed in a substance housed in the treatment unit. The substance is one of a granular media filter bed of a water treatment unit and sludge of a wastewater treatment unit. The method includes the further step of directing a liquid into the treatment unit to cause the float to raise the component out of the substance.

Still a further embodiment of the present invention is directed to an apparatus for facilitating movement of one or more components in a treatment unit. The apparatus includes a component movement assist float assembly configured to be operably connected to one or more components of a treatment unit such that when sufficient liquid is present in the treatment unit, the component movement assist float assembly causes the one or more components to move vertically upward with the component movement assist float in the treatment unit. The treatment unit is one of a water treatment unit and a wastewater treatment unit. The component movement assist float assembly has a plurality of floats and a float support supporting the plurality of floats.

The above summary describes preferred forms of the present invention and is not in any way to be construed as limiting the claimed invention to the preferred forms.

DETAILED DESCRIPTION OF THE PREFERRED EMBODIMENTS OF THE INVENTION

Figure 1:
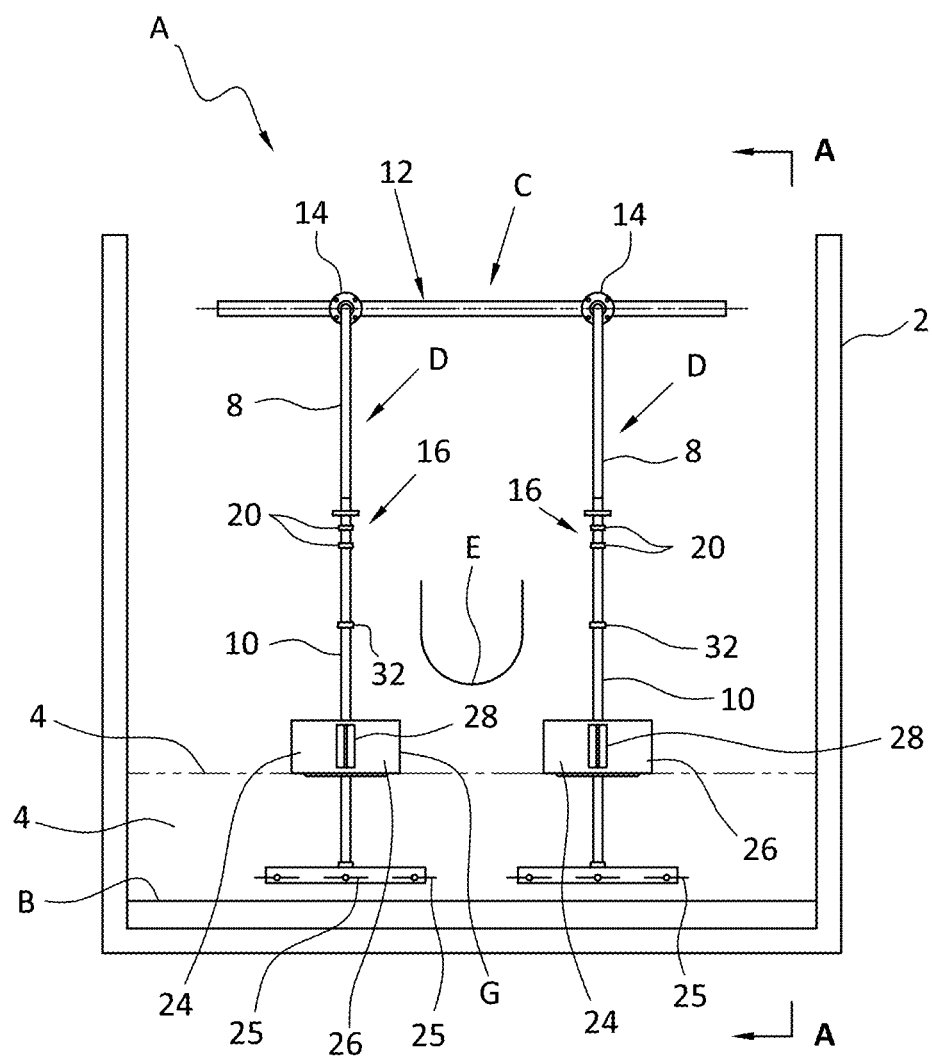
FIG. 1 is a cross-sectional view of one preferred form on the present invention wherein an air scour system is embedded in granular media filter bed and preferred floats are disposed directly above the granular media filter bed with the water level at or below an uppermost portion of the granular media filter bed.

The preferred forms of the invention are described below with reference to FIGS. 1-14. The appended claims are not limited to the preferred forms and no term and/or phrase used herein is to be given a meaning other than its ordinary meaning unless it is expressly stated otherwise.

Preferred devices and associated methods are described herein that facilitate and/or assist in the movement, removal and/or installation of one or more components of a treatment unit. In preferred forms, the devices include one or more floats that are operably associated/connected to one or more components of a treatment unit to move the one or more components from a first position in the treatment unit to a second position in the treatment unit wherein when the one or more components are in the second position the one or more components can be readily and safely accessed by one or more individuals to allow one or more individuals to subsequently remove, service, partially dismantle, etc. the one or more components from the treatment unit. The one or more floats can be installed at any point in time prior to movement and/or removal of the one or more components of the treatment unit. For example, the one or more floats can be installed with the initial installation of the one or more components in the treatment unit, e.g., the one or more floats can be a component of a new system, assembly, device, component, etc. of a treatment unit. Alternatively, the one or more floats can be installed in a treatment unit that has been operating for many years. The treatment unit can be any suitable treatment unit including but not limited a water filter (e.g., upflow filter, downflow filter or bi-flow filter), a sludge collection and treatment unit, a water pretreatment unit and/or wastewater pretreatment unit.

The operable association of the one or more floats can be a direct connection of the one or more floats to the one or more components, an indirect connection of the one of more floats to the one or more components (e.g., an intermediate element is used to connect the one or more floats to the one or more components) or any other operable association that allows the one or more floats to operate/function with the one or more components to facilitate the movement of the one or more components in the treatment unit and/or removal of the one or more components from the treatment unit. The one or more floats can take any suitable shape and can be formed from one or more pieces. The operable association of the one or more floats and the one or more components can be such that the one or more floats can move relative to the one or more components a first distance and after the first distance has been exceeded the one or more floats move with the one or more components. The operable association of the one or more floats and the one or more components can be such that the one or more floats cannot move relative to the one of more components wherein movement of the one or more floats causes movement of the one or more components (e.g., one or more floats are fixed to a drop pipe so that the one or more floats and the drop pipe cannot move relative to each other).

In one preferred method, prior to installation of the one or more floats, the liquid in the containment vessel/compartment of the treatment unit is drained down so that one or more individuals can readily and safely access the one or more components operably associated with the one or more floats. The liquid need not be completely drained. For example, in a filter basin/compartment/housing, water can be drained down so that the level of water in the filter basin/compartment/housing is below an uppermost portion of the filter media of a granular media filter bed. This allows an individual to place a wood plank or other support member on the top of the granular media filter bed so that an individual can safely stand on the wood plank. Subsequently, an individual can safely connect or otherwise secure one or more stops to the one or more components (e.g., a drop pipe of an air scour grid) and further safely connect one or more floats to the one or more components. The individual then exists the treatment unit.

When the one or more floats are operably associated with one or more components with or without one or more stops, a liquid (e.g., filtered or unfiltered water) is introduced into the treatment unit. Where a stop is used with the one or more floats, as the liquid level rises, the one or more floats will move upwardly until the one or more floats engage a corresponding stop (the position of the corresponding stop can be varied to control the process of raising the one or more components). Once the one or more floats engage a corresponding stop, further upward movement of the one or more floats lifts/raises the one or more components with the floats. Where no stop is used, the one or more floats are fixed to the one or more components so that the one or more floats cannot move relative to the one or more components. Where the treatment unit is a water filter or clarifier having a granular media filter bed and the one or more components are embedded in the granular media filter bed, the liquid flowing through the water filter or clarifier causes the granular media filter bed to expand. Once the granular media filter bed is sufficiently expanded (e.g., fluidized), the one or more components rise with the one or more floats. The floats can be configured such that when the liquid level in the treatment unit rises to a maximum level (e.g., the water level is at or adjacent an upper portion of a water trough), the one or more components have moved upwardly a sufficient distance such that a lower portion of the one or more components is disposed above an uppermost portion of a filter bed in a non-expanded state. Once the one or more components have been raised a sufficient distance (e.g., above an uppermost portion of a filter bed in a non-expanded state), liquid flow into the treatment unit is shut-off. Where the treatment unit is a water filter or clarifier having a granular media filter bed, discontinuing liquid flow into the water filter or clarifier causes the filter bed to settle back into a filtering state (e.g., non-expanded or non-fluidized state). The liquid in the treatment unit is then drained down so that the liquid level is below the material/substance which in turn will cause the one or more components and the one or more floats to move down gradually and rest on an uppermost most portion of the material/substance (e.g., an uppermost portion of a filter bed). An individual can then safely enter the treatment unit (e.g., one or more planks can be placed on the upper most portion of material/substance) to perform any further steps necessary (e.g., remove the one or more components from the treatment unit).

Devices of preferred forms of the invention further include one or more flexible piping/conduits that connect one or more components of a treatment unit to a pressurized air source. The one or more flexible piping/conduits allow for movement (e.g., upward and/or downward movement) of one or more components in a treatment unit without disconnecting the flexible piping/conduits from the pressurized air source to assist in, for example, installation and/or removal of the one or more components in the treatment unit. The one or more flexible piping/conduits can be used with or without the one or more floats described above. In one preferred method, the one or more flexible piping/conduits allow for installation of one or more components at a desired point or area in a granular media filter bed. Specifically, one preferred method includes the one or more flexible piping/conduits connected to one or more components of a treatment unit (e.g., a drop pipe of an air scour grid/system including a header and at least one lateral). With the one or more components of a treatment unit resting on a granular media filter bed, a fluid is directed through the granular media filter be to cause a portion of the granular media filter bed to expand so that the one or more components move downwardly. For example, where the granular media filter bed includes an uppermost layer of anthracite and a layer of sand disposed directly below the layer of anthracite, a liquid at a predetermined velocity can be directed in the treatment unit to cause the anthracite layer to expand or fluidize without expanding or fluidizing the sand layer. In this case, the anthracite layer would be configured to have a fluidization velocity less than the fluidization velocity of the sand layer. Once the one or more components have sufficiently descended, the flow of fluid through the granular media filter bed is discontinued so that the one or more components are positioned at a desired location in the granular media filter bed (e.g., resting on an uppermost portion of the sand layer).

In another preferred method, the one or more flexible piping/conduits are connected to one or more components of a treatment unit (e.g., a drop pipe of an air scour grid/system including a header and at least one lateral) having one or more floats operably associated with the one or more components so that the one or more components can be raised in the treatment unit with the one or more floats without disconnecting the one or more components from a source of pressurized air.

In a further preferred method, the one or more flexible piping/conduits are connected to one or more components of a treatment unit (e.g., a drop pipe of an air scour grid/system including a header and at least one lateral) to expedite removal and/or replacement of the granular media filter bed in a treatment unit. From time to time, it may be necessary to replace the filter bed. Prior to removal of the filter bed, the filter bed can be fluidized to remove the air scour grid from the filter bed. The air scour grid can be removed from filter bed using one or more floats or any other removal device and/or process. Once the air scour grid system has been raised a sufficient distance, the flow of liquid is discontinued which causes the filter bed to return to an operating/filtering state (e.g., non-expanded or non-fluidized state). The air scour grid/system can then be lowered to rest on an uppermost portion of the filter bed. The liquid in the treatment unit can be further drained down so that one or more individuals can safely enter the treatment unit. Laterals and/or sub-laterals connected to the air distribution header can be detached from the air distribution header of the air scour grid/system and the air distribution header can be raised and placed on top of the water trough or other support in the treatment unit to allow for the removal of the filter bed. The flexible piping/conduit allows for the movement of the partially dismantled air scour grid/system without disconnecting the air distribution header from the drop pipe and/or the pressurized air source. During this removal process, the pressurized air source is shut-off. Once the filter bed has been removed and replaced with a new filter bed. The laterals and/or sub-laterals can be reconnected to the air distribution header and the new filter bed can be subsequently fluidized or expanded to allow for installation of the air scour grid/system in the new filter bed by the process described above.

FIGS. 1 Through 6

Referring to FIGS. 1 to 6, treatment unit A employing a preferred form of the invention is illustrated in one of many possible configurations. The treatment unit A can take many forms including but not limited to an upflow filter/clarifier, a downflow filter/clarifier, a bi-flow filter/clarifier, a sludge collection and/or treatment unit or a water or wastewater pretreatment unit.

Figure 13:
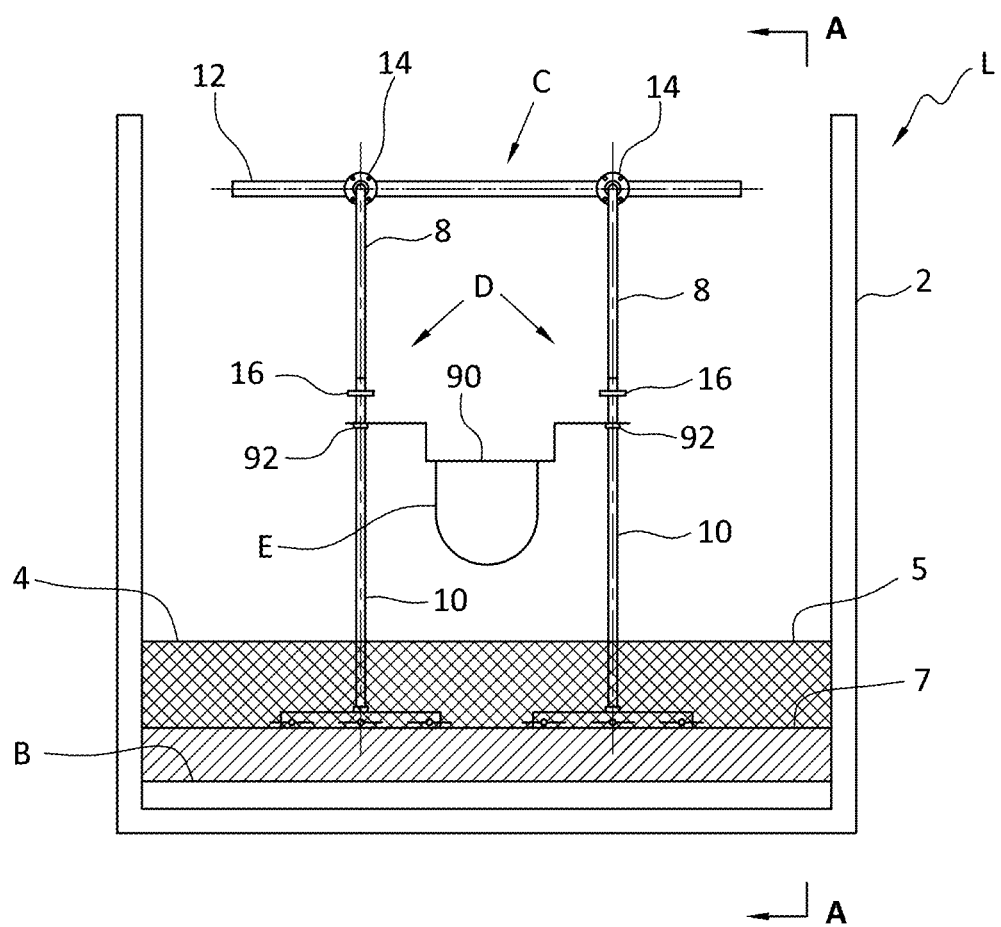
FIG. 13 is a cross-sectional view of a further preferred embodiment of the present invention.

Treatment unit A, in one most preferred form, is a water filter/clarifier for removing impurities from water. Treatment unit A includes a containment basin/vessel/compartment 2 housing a granular media filter bed 4. The granular media filter bed 4 may include one or more layers of media. For example, the granular media filter bed 4 may include an upper layer of anthracite 5 and a lower layer of sand 7 as illustrated in FIG. 13. The sand layer can be supported by one or more layers of gravel. The granular media filter bed 4 may be supported by an underdrain B for controlling the flow of fluid (e.g., liquid and air) through granular media filter bed 4. Underdrain B can take any suitable form including an underdrain that eliminates the need for one or more gravel support layers supporting one or more layers of filter media. Underdrain B, as is well-known, provides a washing liquid (e.g., filtered water) upwardly through the filter bed during a washing cycle that includes a washing liquid. The washing cycle may also include an air scour of the filter bed by an air scour system separate from underdrain B as in a preferred form of the present invention so that a washing liquid and air scour are directed through at least a portion of the filter simultaneously or at different times during a washing cycle of the filter bed.

Treatment unit A includes an air scour system C a portion of which is embedded in granular media filter bed 4. Air scour system C may take many different forms. Referring to FIGS. 1, 3 and 5, air scour system C includes two air grids/systems D. However, the air scour system may include only one or more than two air grids/systems. Air grids D can be identical in configuration. In the embodiment depicted in FIGS. 1 to 6, a water trough E is disposed between the two air grids/systems D. As the level of water in compartment 2 rises to a sufficient level, water will spill over into the trough E and subsequently be drained from compartment 2. Each air grid/system D preferably includes one or more pieces of flexible conduit/piping 8 connecting a drop pipe 10 to a raised air supply header 12. Piping 8 can be formed from any suitable material including but not limited to stainless steel braiding, interlocked metal, rubber or other flexible material. Piping 8 can be corrugated to enhance flexibility. While the two flexible piping conduits 8 are depicted as being connected to a single air supply header, each flexible piping 8 can be connected to a separate air supply header. The air supply header 12 is preferably fixed in a desired position in or above filter compartment 2, i.e., the air supply header 12 preferably does not move relative to compartment 2.

Figure 2:
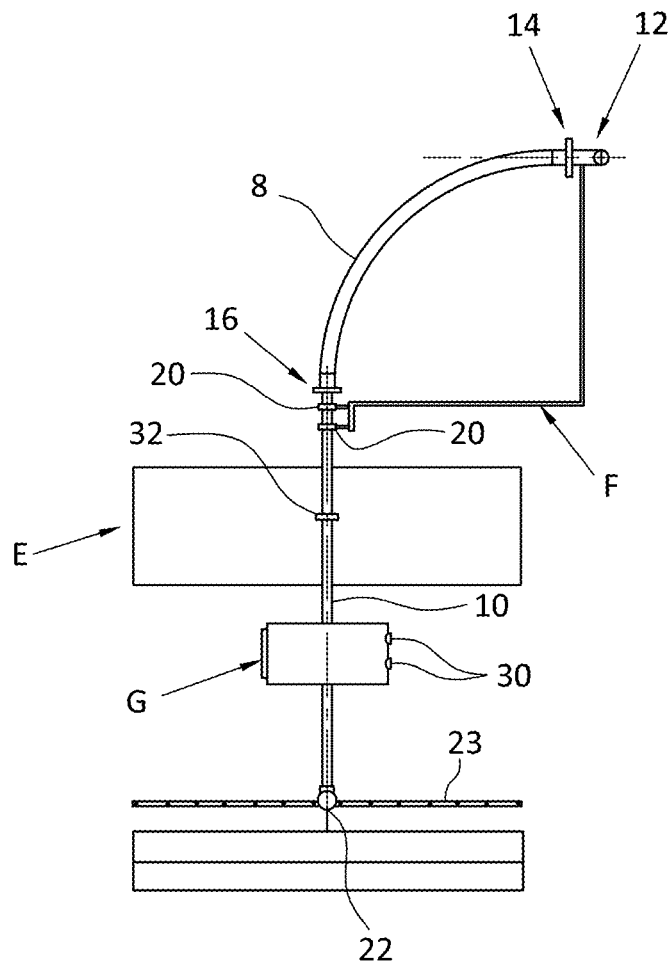
FIG. 2 is a sectional view taken along lines A-A of FIG. 1.
Figure 3:
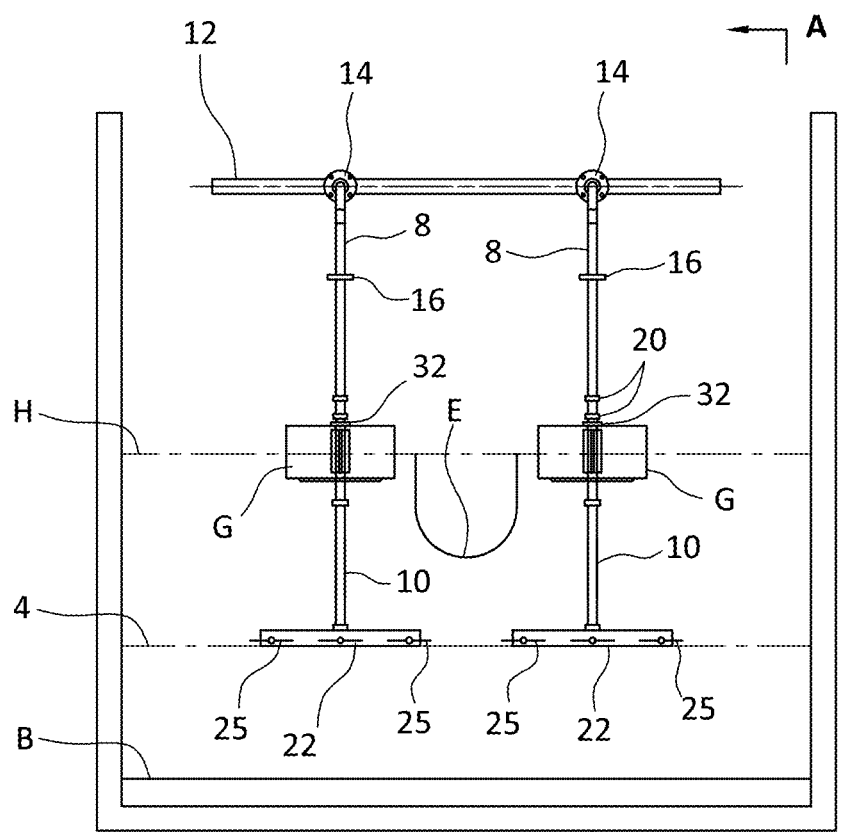
FIG. 3 is a cross-sectional view of the embodiment illustrated in FIG. 1 where the water in the filter compartment has risen to a level where the air scour grid is at a position that is above an uppermost portion of the filter bed when the filter bed is in a non-expanded state.

Referring to FIG. 2, connector 14 (e.g., a T-shaped connector) connects an upper end of conduit 8 to air supply header 12 preferably in an airtight manner and connector 16 connects lower end of conduit 8 to an upper end of the corresponding drop pipe 10. Connectors 14 and 16 can take any suitable form.

Each air grid/system D further preferably includes support and guide member F as seen in, for example, FIG. 2. The support and guide member F can be fixed to air supply header 12 or to filter compartment 2 or any other suitable component located in or above compartment 2 using any suitable connection device, means, etc. Preferably, member F includes a pair of spaced guide rings 20 each having a central opening that receives and guides vertical movement of the corresponding drop pipe 10 through the corresponding guide rings 20. It should be noted that the form of member F can be readily varied. For example, a cylindrical collar can be used in place of the two spaced guide rings 20. Guide rings 20 maintain the corresponding air grid/system D in a desired orientation even when the air grid/system D is moved in compartment 2.

Each drop pipe 10 is connected to an air distribution header 22 preferably in a fluid tight manner. One or more distribution laterals 23 can extend outwardly from each side of air distribution header 22. Further, one or more distribution sub-laterals 25 having one or more openings can extend outwardly from each side of the one or more laterals. The air distribution header, the laterals and sub-laterals function to direct pressurized air into the filter bed through the one or more openings in the sub-laterals to assist in cleaning the filter bed in a well-known manner. Where sub-laterals are not used, the laterals can have one or more openings that allow pressurized air to pass into and through the filter bed during a cleaning/washing cycle.

Referring to FIG. 1, a float G is preferably mounted about a portion of each drop pipe 10 so that a lower portion of float G rests on an upper portion of filter bed 4. As previously explained, float G is mounted about each drop pipe 10 prior to removal or raising of air grid/system D. Float G can be installed with the initial installation of the corresponding air grid/system D or on an existing air grid/system that has been operating for some time. Float G includes a first member 24 pivotally connected to a second member 26 by hinge 28. An inner portion of each member 24 and 26 has a recess that forms a central opening extending through float G when member 24 is connected to member 26 to receive drop pipe 10. The central opening is preferably sized to allow float G to slide on drop pipe 10. Referring to FIG. 2, one or more latches 30 may be used to detachably connect first member 24 to second member 26. A stop 32 is fixed to each drop pipe 10 so that stop 32 does not move relative to the corresponding drop pipe 10. The spacing between stop 32 and float G can be adjusted to adjust and control the raising of air grid/system D. Stop 32 can take any suitable form including but not limited to a circular or non-circular ring or collar fixed to drop pipe 10. Stop 32 could take the form of one or more pins or projections extending outwardly from drop pipe 10.

As water is directed into the filter compartment 2 and the water level rises in compartment 2, floats G will slide upwardly along the corresponding drop pipe 10 and engage the corresponding stop 32, i.e., floats G move upwardly relative to the corresponding drop pipe 10. Further upward movement will cause float G and the corresponding air grid/system D to rise upwardly as a unit. Directing water into the compartment 2 at a predetermined velocity, will cause the bed to sufficiently expand (e.g., fluidize) to allow the previously embedded portion of the air grid/system D to move upwardly with float G. FIG. 3 illustrates the water level H at the top of trough E with floats G and the air grids/systems D raised directly above filter bed 4, i.e., no portion of air grid/system D is embedded in filter bed 4. Filter bed 4, as shown in FIG. 3, is in an operating/filtering state, i.e., where the bed 4 is not expanded or fluidized. This state is achieved by discontinuing the flow of water into compartment 2 which allows the previously expanded filter bed 4 to settle into the state shown in FIGS. 1 and 3. Subsequently, water in compartment 2 is gradually drained causing floats G and the air grids/systems D to move downwardly so that a lowermost portion of each of the air grids/systems D rests on an uppermost portion of bed 4. Water can be completely drained from compartment 2 or drained such that the water level in compartment 2 is below an uppermost portion of bed 4. One or more individuals can then safely enter compartment 2 to remove or perform maintenance or other processes on the air grids/systems D and/or remove and replace filter bed 4.

Figure 4:
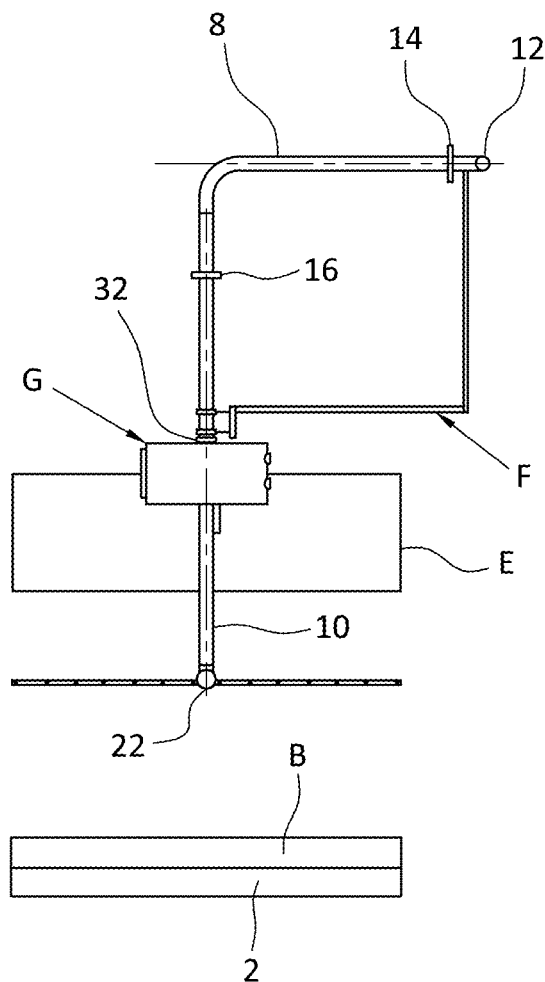
FIG. 4 is a sectional view taken along lines A-A of FIG. 3.
Figure 5:
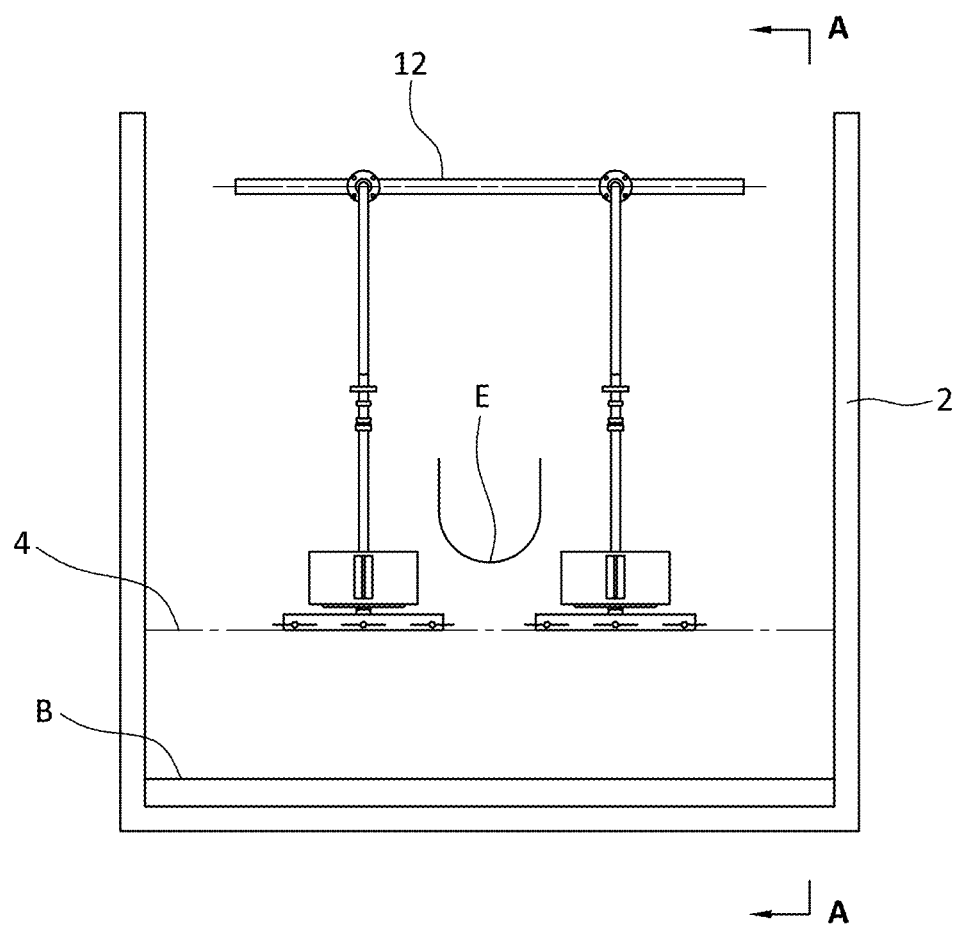
FIG. 5 is a cross-sectional view of the embodiment illustrated in FIG. 1 where water in the filter compartment has been drained down to a point at or below the uppermost portion of granular media filter.
Figure 6:
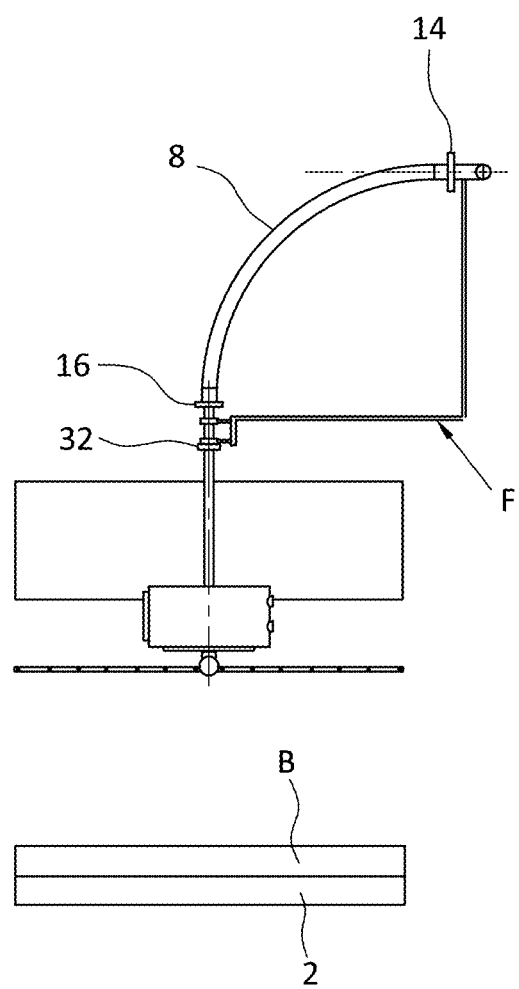
FIG. 6 is a sectional view taken along lines A-A of FIG. 5.
Figure 7:
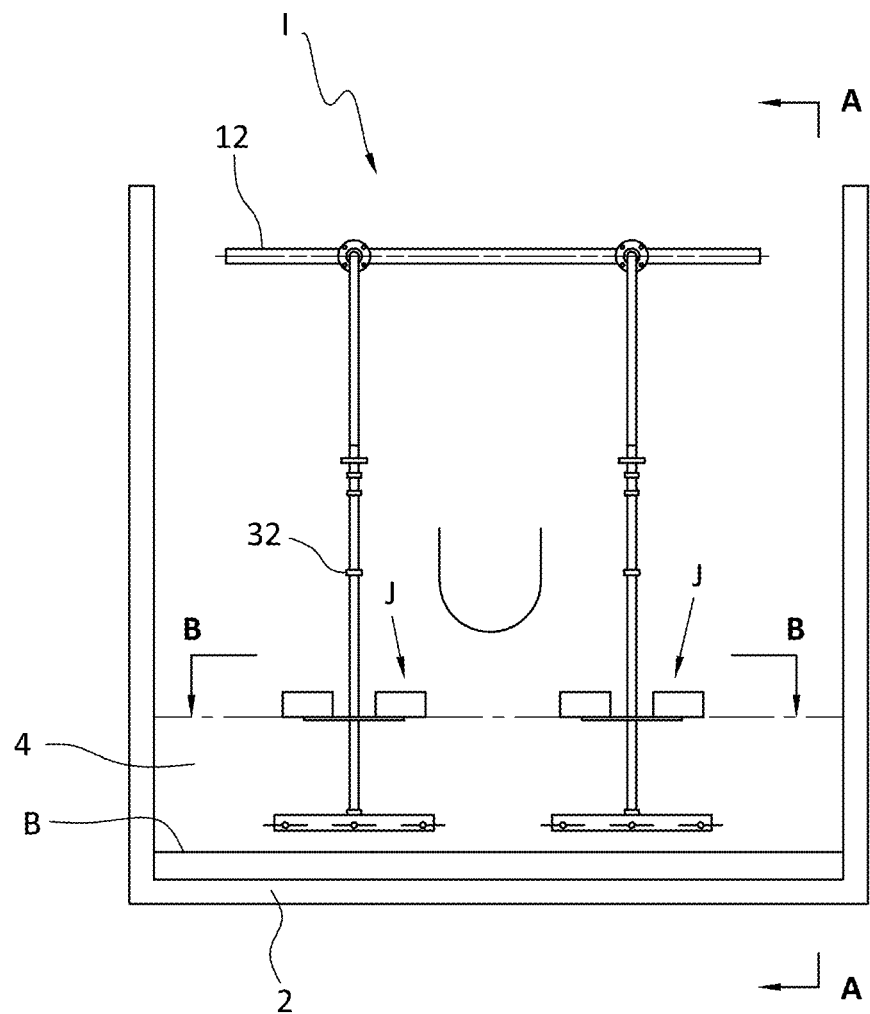
FIG. 7 is a cross-sectional view of an alternative form of the present invention wherein an air scour system is embedded in a granular media filter bed and a pair of float assemblies are disposed directly above the granular media filter bed with the water level at or below an uppermost portion of the granular media filter bed.
Figure 8:
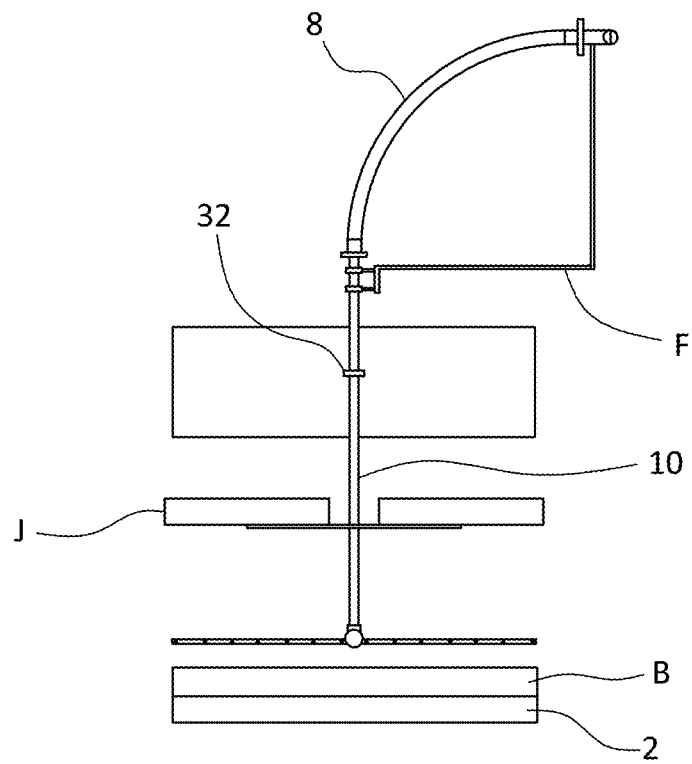
FIG. 8 is a sectional view taken along lines A-A of FIG. 7.

Conduits 8 allow for movement (e.g., upward and downward vertical movement) of the corresponding air grid/system D without disconnecting drop pipes 10 from the air supply header 12 as shown in, for example, FIGS. 2 and 4. However, conduits 8 need not be used. As explained below in connection with the embodiment depicted in FIGS. 11 and 12, drop pipes 10 can be fixed to one or more air supply headers. In this embodiment, the fixed connection can be dismantled to allow raising/lowering of air grid/system D. FIGS. 7 Through 10

Referring to FIGS. 7 to 10, treatment unit I employing another preferred form of the invention is illustrated in one of many possible configurations. Treatment unit I is identical to treatment unit A with the sole exception being that each of floats G of treatment unit A are replaced with float assembly J. The same components have been given the same reference numerals/letters. Each float assembly J preferably includes four floats 40, 42, 44 and 46 mounted on a support member/frame 48.

Figure 10:
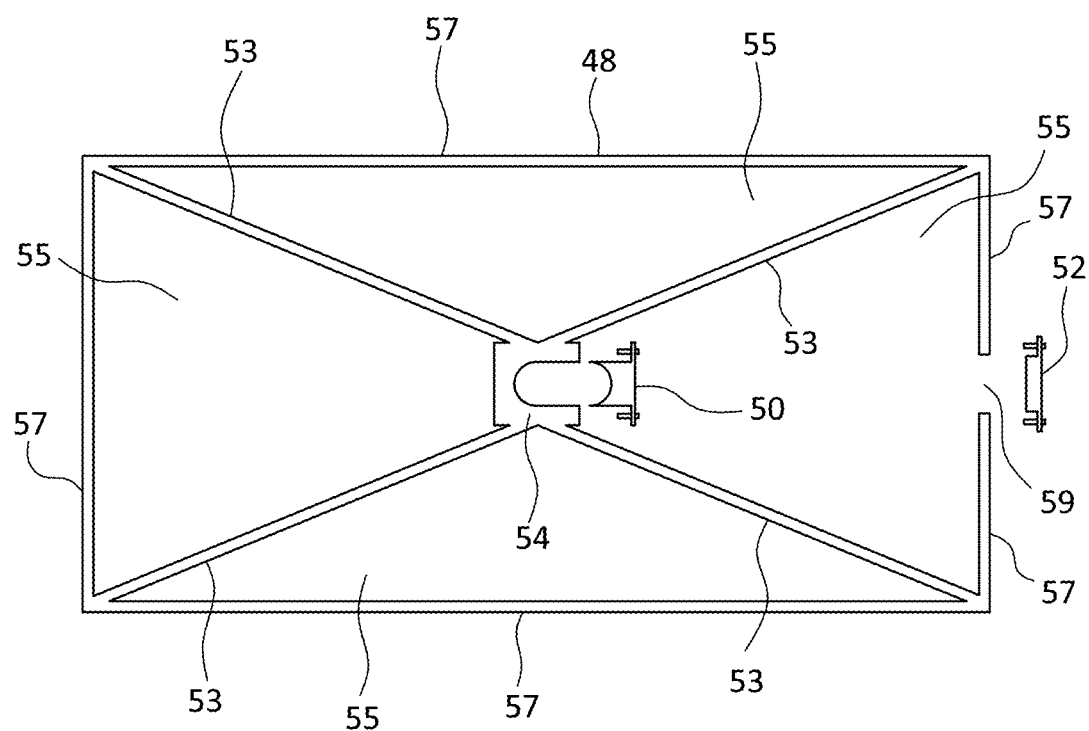
FIG. 10 is a plan view of a preferred float support frame.

Referring to FIG. 10, float frame 48 includes a pair of detachable connection members 50 and 52 to allow for installation of float assembly J about a corresponding drop pipe 10. Connection member 50 when attached to center portion 54 of frame 48 forms a central opening extending through frame 48 to receive a corresponding drop pipe 10 and allow frame 48 to move upwardly relative to the corresponding drop pipe 10 until center portion 54 engages a corresponding stop 32. A pair of fasteners (e.g., screws, bolts, etc.) may be used to detachably connect member 50 to center portion 54. Similarly, a pair of fasteners may be used to detachably connect member 52 to an outer portion of frame 48. Frame 48 includes support members 53 connected to and extending outwardly from center portion 54. The outer portions of members 53 are connected to outer frame members 57. Openings 55 extending through frame 48 are formed between adjacent support members 53. Frame 48 further includes an opening 59. When frame 48 is installed about a corresponding drop pipe 10, members 50 and 52 are detached from frame 48 and frame 48 is manipulated such that drop pipe passes through opening 59 and is received in the U-shaped recess of center portion 54. Once frame 48 is so positioned, members 50 and 52 are connected to frame 48.

Figure 9:
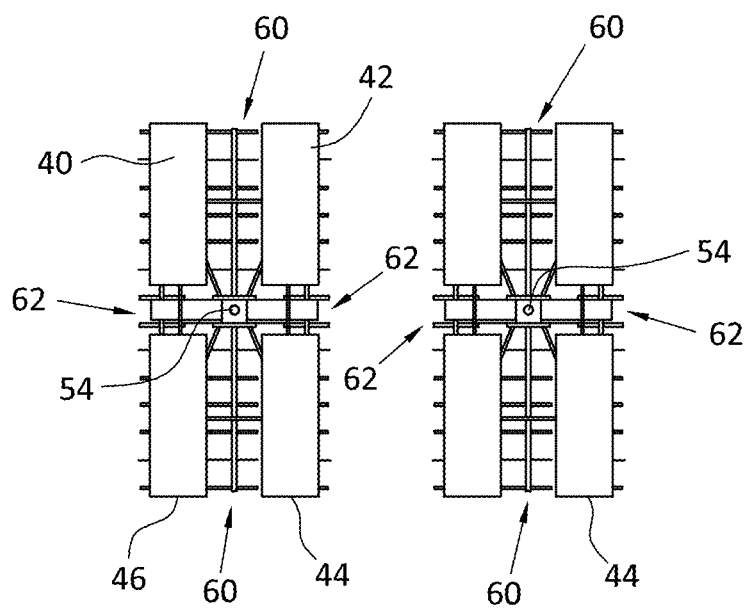
FIG. 9 is a sectional view taken along lines B-B of FIG. 7.

Referring to FIG. 9, the positioning of floats 40, 42, 44 and 46 on support member/frame 48 preferably creates spaces 60 and 62 between adjacent floats. Spaces 60 extend perpendicular to air distribution header 22 and spaces 62 extend parallel to air distribution header 22. Spaces 60 and 62 are configured to receive one or more support members or other members in the compartment 2 and allow assembly J to move upwardly despite the presence of the one or more supports members or other members in compartment 2. The number of floats of assembly J may be varied. For example, assembly J may include two, three or more than four floats. The positioning of the two, three or more than four floats may be varied depending upon the existing structures in compartment 2 to allow for upward movement of assembly J despite the presence of existing structures in compartment 2 that would otherwise prevent upward movement of assembly J.

Assembly J operates in the same manner as float G to allow for vertical movement of corresponding air grid/system in compartment 2.

Figure 11:
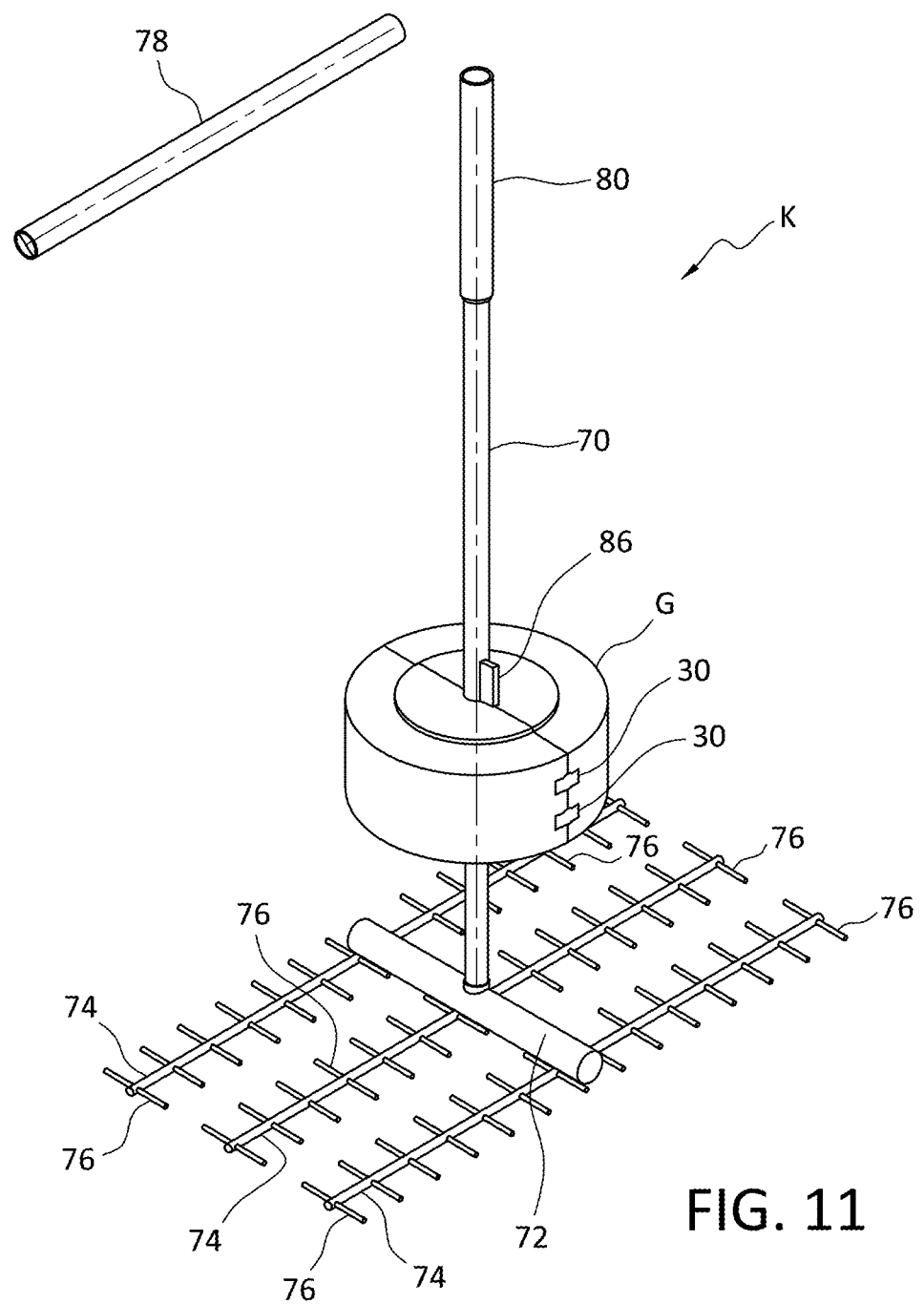
FIG. 11 is a perspective view of another alternative form of the present invention.
Figure 12:
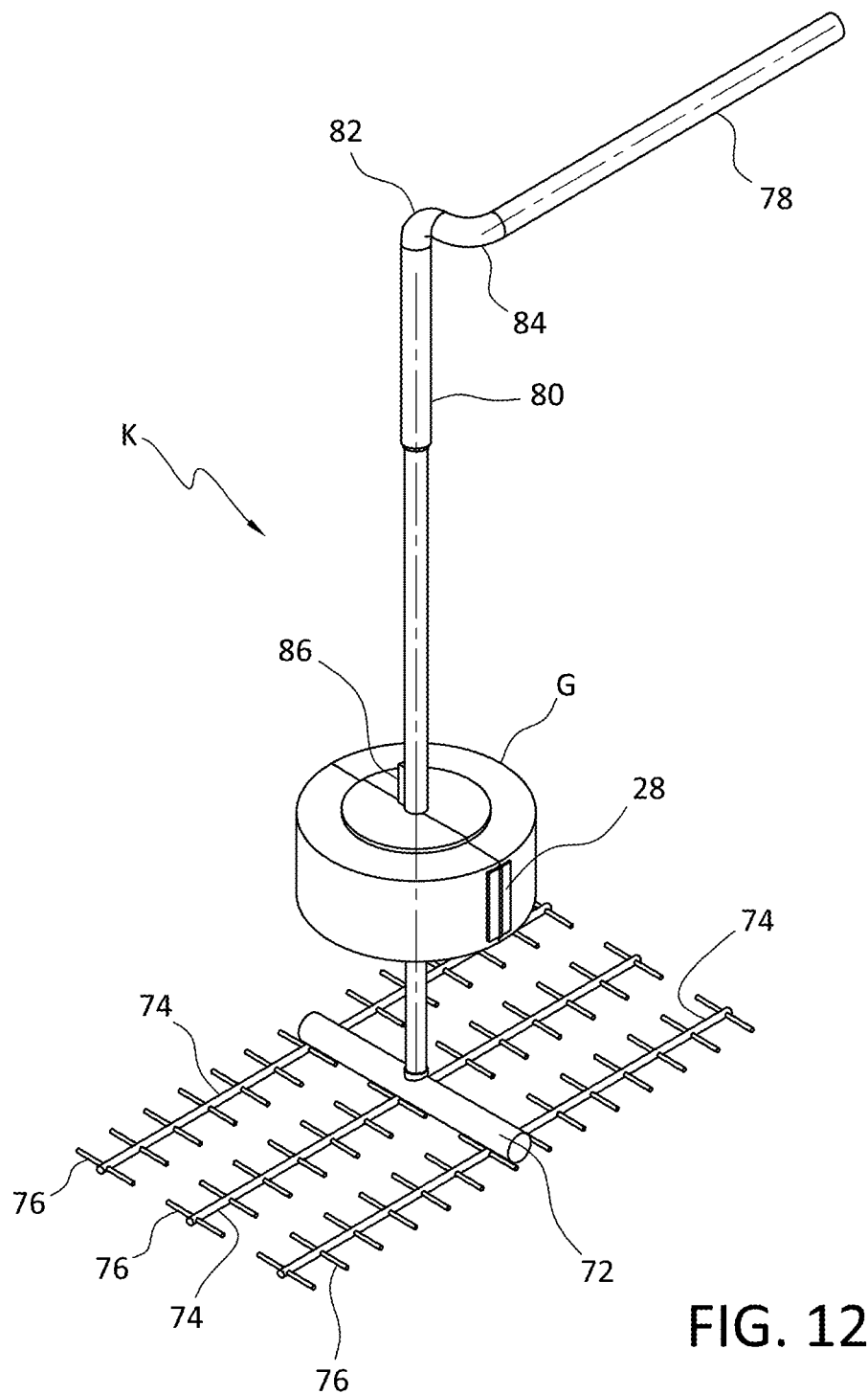
FIG. 12 is a perspective view of the alternative form of the present invention depicted in FIG. 11 attached to a pressurized supply pipe.

FIGS. 11 and 12

Referring to FIGS. 11 and 12, an air grid K formed in accordance with a further preferred form of the invention is illustrated in one of many possible configurations. Air grid K includes a drop pipe 70, an air distribution header 72, laterals 74 and sub-laterals 76. Sub-laterals 76 each preferably have a plurality of openings that allow air to escape into the filter bed. Float G is mounted about drop pipe 70. An air supply header 78, connected to a pressurized air source, is fixed to drop pipe 70 by connectors 80, 82 and 84. The number and form of connectors for connecting air supply header 78 to drop pipe 70 may be readily varied.

A stop 86 extends outwardly from drop pipe 70. Stop 86 can take the form of a plurality of vertically aligned pins or projections. Float G operates in the same fashion as described in connection with the embodiment illustrated in FIGS. 1 to 6. However, drop pipe 70 must be disconnected from header 78 prior to movement of grid K. For example, an individual can cut through connector 84 to allow for vertical movement of grid K.

Figure 14:
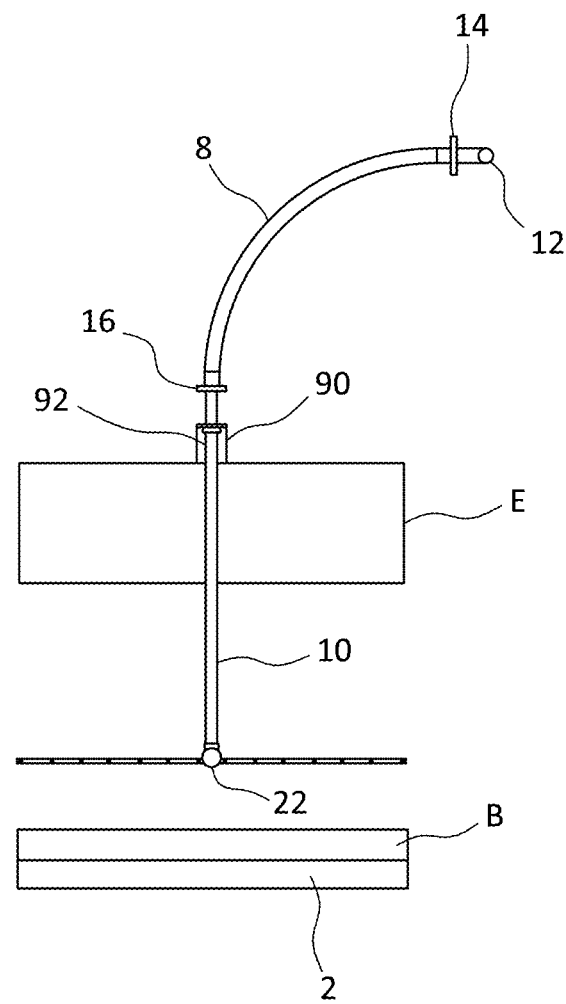
FIG. 14 is a sectional view taken along lines A-A of FIG. 13.

FIGS. 13 and 14

Referring to FIGS. 13 and 14, treatment unit L employing another preferred form of the invention is illustrated in one of many possible configurations. Treatment unit L is similar to treatment unit A and, therefore, only the differences will be described in detail. The same components have been given the same reference numerals/letters. In this embodiment, no floats are employed. In this embodiment, filter bed 4 includes an anthracite layer 5 and a sand layer 7. Support and guide member 90 is fixed to the top of trough E adjacent drop pipes 10. Support and guide member 90 can take the form of a thin, narrow plate. Member 90 can be used in any other embodiment disclosed herein. An annular guide collar 92 having a central opening extending therethrough is mounted adjacent each end of member 90 to receive and allow each drop pipe 10 to move in guide collar 92 and relative to member 90.

With the level of liquid in compartment 2 at or below an upper portion of layer 5, one or more individuals can enter compartment 2 and fully assembly air scour system C and connect the same to air supply header 12 so that a lowermost portion of each air grid D rests on an uppermost portion of layer 5. When no individuals are in compartment 2, a liquid (e.g., filtered or unfiltered water) is directed upwardly through filter bed 4 to cause layer 5 to expand or fluidize while layer 7 remains in an unexpanded state. This process will cause air grids D to automatically move downwardly and rest on an uppermost portion of layer 7. Collars 92 maintain air grids D in the desired orientation while air grids D move downwardly. Air grids D can be removed from filter bed 4 in a similar fashion, i.e., expand or fluidize layer 5 and then raise grids D using any suitable lifting device and/or process. Flexible piping/conduits 8 allow for vertical movement (up and down) of air grids D without disconnecting air grids D from air supply header 12.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A method of filtering water using a filter bed and an air scour system operably associated with the filter bed of granular media to introduce air into the filter bed during at least a portion of a washing cycle to assist in removal of impurities trapped in the filter bed during a filtration cycle, the method comprising the steps of:

(a) providing a filter compartment having a filter bed including at least one layer of granular media disposed on or above an underdrain, the underdrain being configured to control the flow of liquid through the filter bed;

(b) providing an air scour system operably associated with the filter bed for introducing air into the filter bed during at least a portion of a washing cycle to assist in removal of impurities trapped in the filter bed during a filtration cycle, the air scour system including a vertically extending drop pipe fluidly connected to an air header and a plurality of air laterals;

(c) providing a flexible conduit having a first end and a second end, the flexible conduit is coilless;

(d) connecting the first end of the flexible conduit to a source of pressurized air; and (e) connecting the second end of the flexible conduit to said vertically extending drop pipe to supply pressurized air to and through each of said vertically extending drop pipe, said air header and said plurality of air laterals so that pressurized air is introduced into the filter bed during at least a portion of a washing cycle.

2. The method of claim 1, wherein:
(a) the flexible conduit facilitates one of installation of the air scour system in the filter bed, movement of the air scour system relative to the filter bed and removal of the air scour system from the filter bed, and wherein an uppermost end of said vertically extending drop pipe is vertically aligned with said second end of said flexible conduit.

3. The method of claim 1, wherein:
(a) the air scour system has a first orientation when in an operating position in which pressurized air is introduced into the filter bed during at least a portion of a washing cycle; and,
(b) providing a guide member configured to maintain the air scour system in the first orientation when the air scour system is moved relative to the filter bed, and wherein said second end of said flexible conduit is disposed within a perimeter of the filter compartment defined by an inner surface of one or more walls of the filter compartment so that the second end of said flexible conduit is disposed inwardly of the inner surface of each of the one or more walls of the filter compartment.

4. The method of claim 1, comprising the further step of:
(a) directing a liquid upwardly through the filter bed to allow for movement of the air scour system relative to the filter bed.

5. The method of claim 3, wherein:
(a) the guide member is a cylindrical collar configured to allow portions of the vertically extending drop pipe to slide through said cylindrical collar, and wherein a vertical axis extending through a center of said cylindrical collar passes through at least a portion of said flexible conduit.

6. The method of claim 3, wherein:
(a) the guide member includes one or more guide rings configured to allow portions of the vertically extending drop pipe to slide through the one or more guide rings, wherein each of the one or more guide rings are vertically aligned with a lowermost portion of the flexible conduit.

7. The method of claim 1, wherein:
(a) at least a portion of said air header and said plurality of air laterals are disposed in said filter bed between an uppermost portion of the filter bed and the underdrain.

8. The method of claim 7, wherein:
(a) at least a portion of said vertically extending drop pipe is disposed in the filter bed between an uppermost portion of the filter bed and the underdrain; and,
(b) the air scour system includes a horizontally extending air supply header fixed in a predetermined position in the filter compartment or at least a major portion of the horizontally extending air supply header is positioned within a perimeter defined by an innermost surface of each wall of the filter compartment such that the horizontally extending air supply header does not move relative to the filter compartment during operation of the filter during both a filtration cycle and a washing cycle, the first end of the flexible conduit is connected to the horizontally extending air supply header to receive pressurized air from the horizontally extending air supply header during a washing cycle including an air souring of the filter bed and wherein a vertical axis passing through a center of an uppermost opening of the vertically extending drop pipe passes through at least a portion of the second end of the flexible conduit.

9. A filter for filtering water using a filter bed and an air scour system operably associated with the filter bed of granular media to direct air into the filter bed during at least a portion of a washing cycle to assist in removal of impurities trapped in the filter bed during a filtration cycle, the filter comprising:
(a) a filter compartment having a filter bed including at least one layer of granular media disposed on or above an underdrain, the underdrain being configured to control the flow of liquid through the filter bed, the first compartment including an outer perimeter and an inner perimeter, the outer perimeter being defined by an exterior surface of one or more vertical walls of the filter compartment and the inner perimeter being defined by an inner surface of the one or more vertical walls of the filter compartment;
(b) an air scour system operably associated with the filter bed for introducing air into the filter bed during at least a portion of a washing cycle to assist in removal of impurities trapped in the filter bed during a filtration cycle, the air scour system including a vertically extending drop pipe fluidly connected to an air distribution header and a plurality of air laterals;
(c) a flexible conduit having a first end and a second end, the flexible conduit is coilless, the first end of the flexible conduit is connected to a source of pressurized air and the second end of the flexible conduit is connected to said vertically extending drop pipe to supply pressurized air to and through each of said vertically extending drop pipe, said air distribution header and said plurality of air laterals so that pressurized air is introduced into the filter bed during at least a portion of a washing cycle, and wherein said second end of said flexible conduit is disposed within the inner perimeter of the filter compartment so that the second end of said flexible conduit is positioned inwardly of the inner surface of each of the one or more vertical walls of the filter compartment.

10. The filter of claim 9, wherein:
(a) the air scour system further includes an air supply header fixed in a predetermined position in or above the filter compartment such that the air supply header does not move relative to the filter compartment during operation of the filter during both a filtration cycle and a washing cycle, the first end of the flexible conduit is connected to the air supply header to receive pressurized air from the air supply header during a washing cycle including an air souring of the filter bed and wherein no portion of the flexible conduit is disposed outside of the inner perimeter of the filter compartment.

11. The filter of claim 10, further including:
(a) a guide member operably associated with the vertically extending drop pipe and configured to maintain the air scour system in a first orientation when the air scour system is moved relative to the filter bed during one of installation of the air scour system in the filter bed, movement of the air scour system relative to the filter bed and removal of the air scour system from the filter bed, the first orientation being an orientation when the air scour system is in an operating position to introduce pressurized air into the filter bed, wherein a vertical axis passing through a center portion of the guide member passes through at least a portion of the flexible conduit.

12. A method of filtering water using a filter bed and an air scour system operably associated with the filter bed of granular media to direct air during at least a portion of a washing cycle to assist in removal of impurities trapped in the filter bed during a filtration cycle, the method comprising the steps of:
(a) providing a filter compartment having a filter bed including at least one layer of granular media disposed on or above an underdrain, the underdrain being configured to control the flow of liquid through the filter bed;
(b) providing an air scour system operably associated with the filter bed for introducing air into the filter bed during a washing cycle to assist in removal of impurities trapped in the filter bed during a filtration cycle, the air scour system including an air supply pipe fluidly connected to an air header and a plurality of air laterals;
(c) providing a flexible conduit having a first end and a second end, the flexible conduit is coilless;
(d) connecting the first end of the flexible conduit to a source of pressurized air; and
(e) connecting the second end of the flexible conduit to said air supply pipe to supply pressurized air to and through each of said air supply pipe, said air header and said plurality of air laterals so that pressurized air is introduced into the filter bed during at least a portion of a washing cycle, wherein the first end of the flexible conduit is disposed in the filter compartment below an uppermost portion of a wall of the filter compartment when the air scour system is in an operating position.

13. The method of claim 12, wherein:
(a) the flexible conduit facilitates one of installation of the air scour system in the filter bed, movement of the air scour system relative to the filter bed and removal of the air scour system from the filter bed; and,
(b) said air supply pipe is a vertically extending drop pipe, and wherein a vertical axis passing through a center of an uppermost opening of the vertically extending drop pipe passes through at least a portion of the second end of the flexible conduit.

14. The method of claim 12, wherein:
(a) the plurality of laterals extend outwardly in a horizontal direction from the air header.

15. The method of claim 14, wherein:
(a) the plurality of laterals are disposed in the filter bed between an uppermost portion of the filter bed and an uppermost portion of the underdrain.

16. The method of claim 15, wherein:
(a) at least a portion of the air header is disposed in the filter bed between an uppermost portion of the filter bed and an uppermost portion of the underdrain.

17. The method of claim 12, wherein:
(a) the air scour system has a first orientation when in an operating position in which air is introduced into the filter bed during at least a portion of a washing cycle; and,
(b) providing a guide member configured to maintain the air scour system in the first orientation when the air scour system is moved relative to the filter bed.

18. The method of claim 17, wherein:
(a) the guide member is one of a cylindrical collar and one or more guide rings.

19. The method of claim 12, further including the step of:
(a) during a washing cycle of the filter bed directing pressurized air through the air scour system upwardly through at least a portion of the filter bed and subsequently directing a washing liquid upwardly through the underdrain and the filter bed.

20. The method of claim 12, further including the step of:
(a) during a washing cycle of the filter bed directing pressurized air through the air scour system upwardly through at least a portion of the filter bed and simultaneously directing a washing liquid upwardly through the underdrain and the filter bed.

* * * * *